Feb. 14, 1933.  A. LIERMANN  1,897,062
MINIATURE HOTHOUSE
Filed June 27, 1932    3 Sheets-Sheet 3
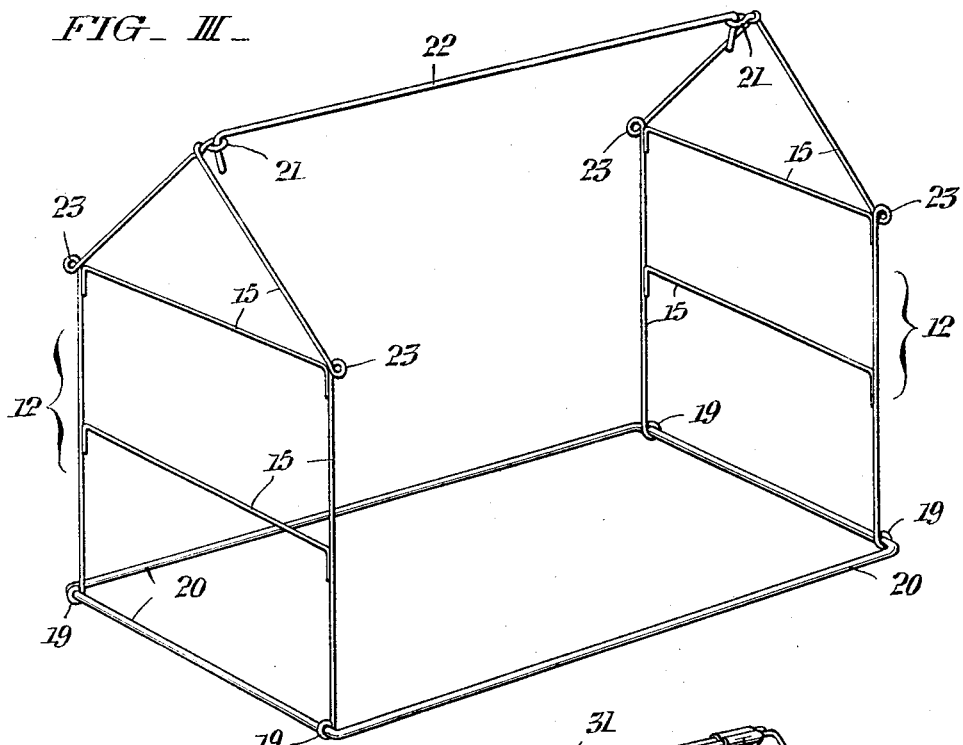
FIG. III
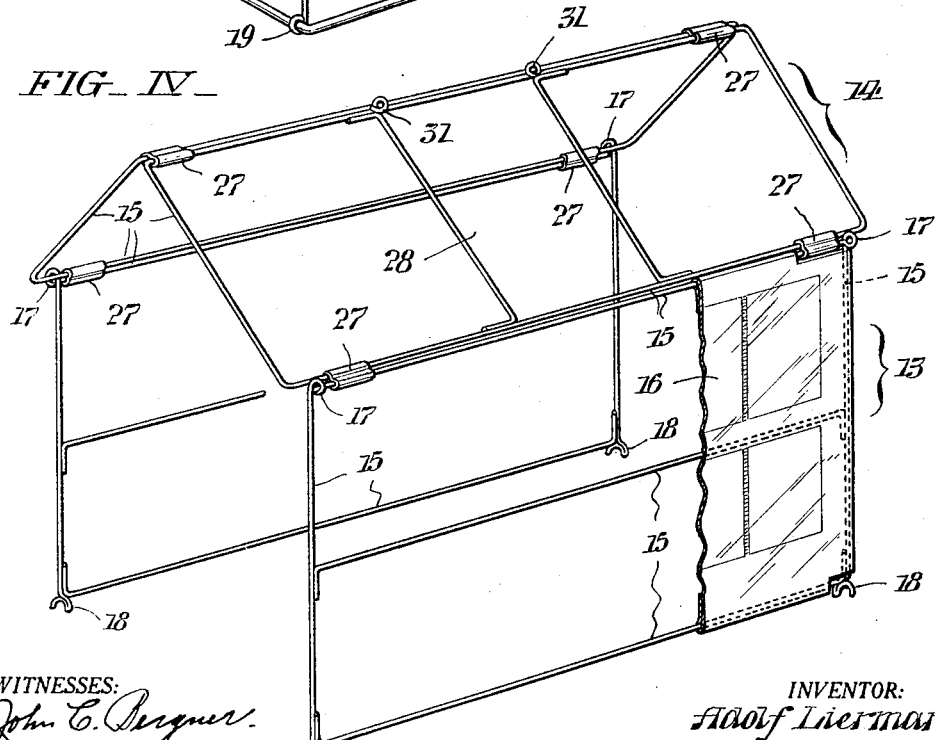
FIG. IV
WITNESSES:
John C. Bergner
Hubert Fuchs
INVENTOR:
Adolf Liermann,
BY Fraley & Paul
ATTORNEYS.

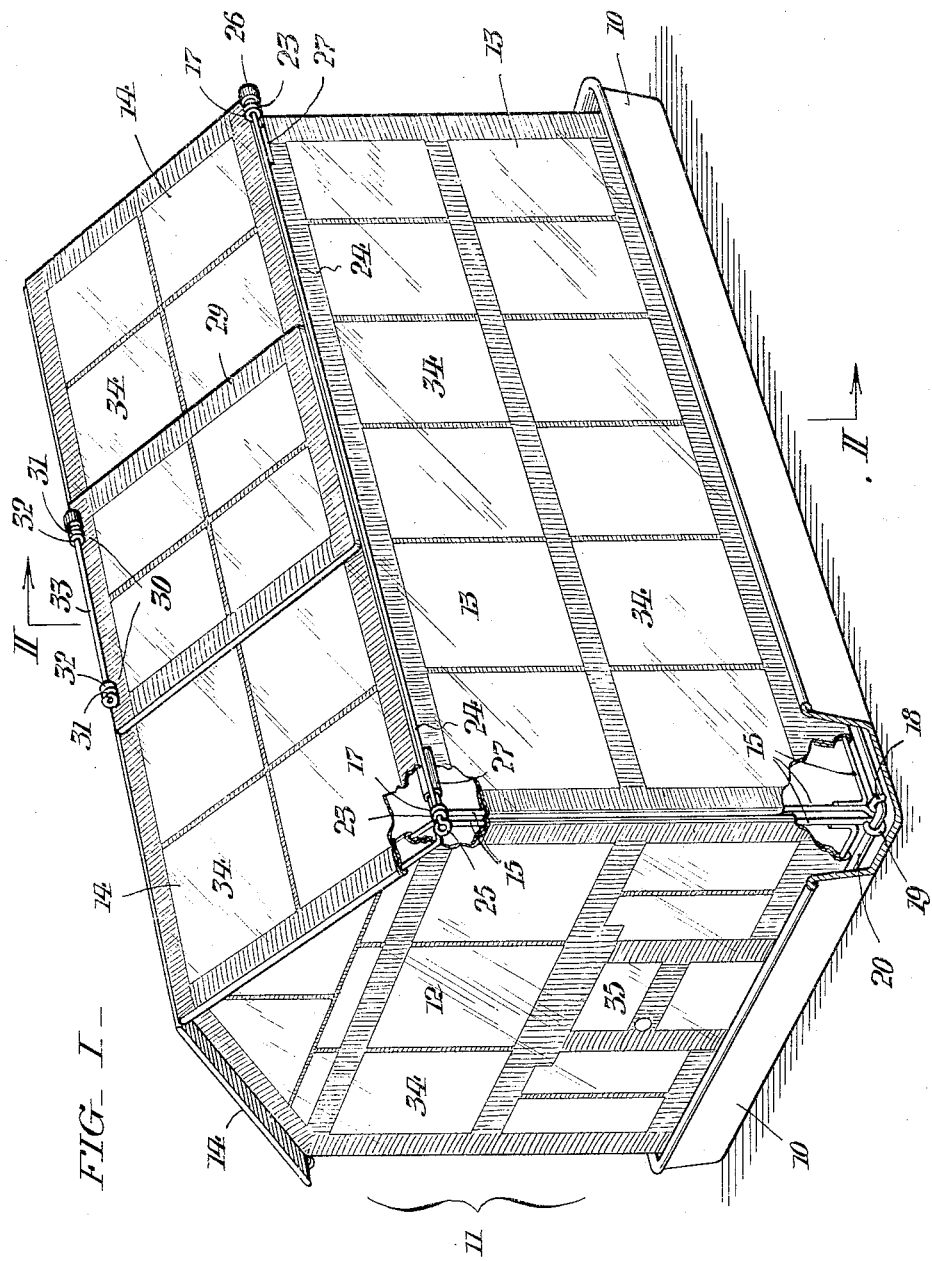

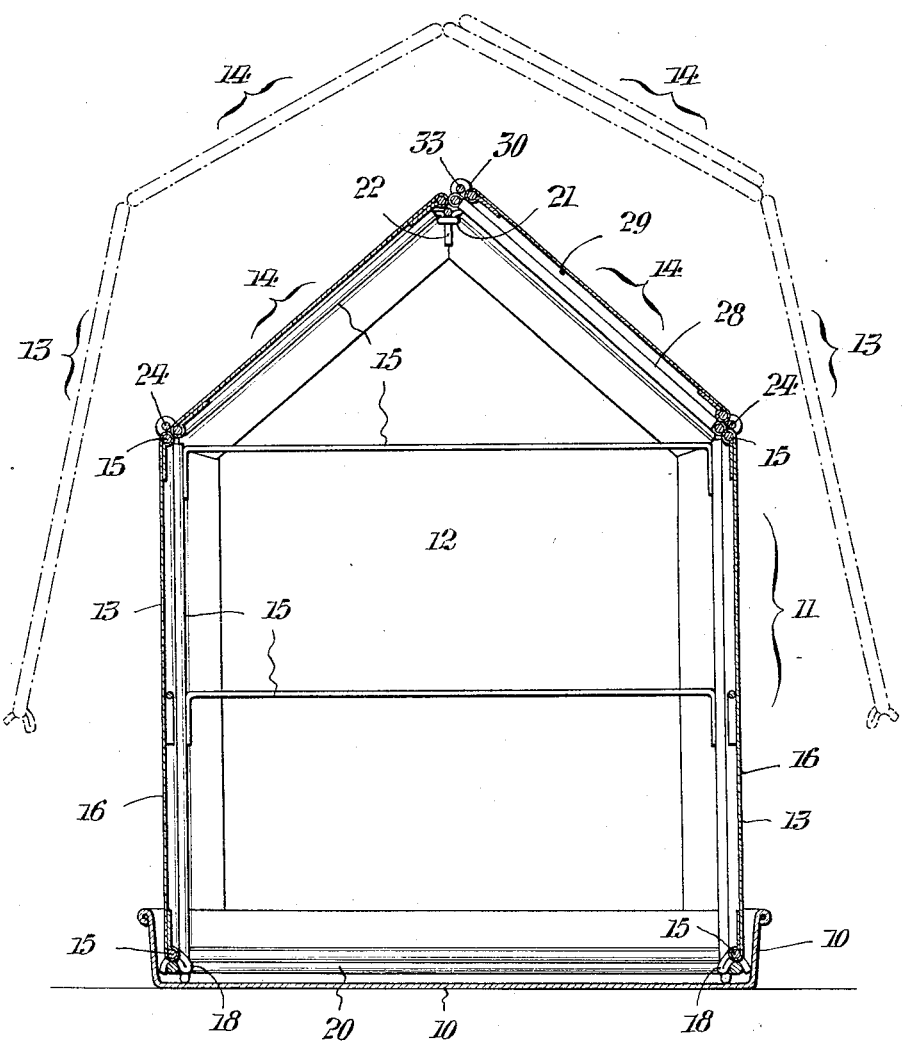

Patented Feb. 14, 1933

1,897,062

UNITED STATES PATENT OFFICE

ADOLF LIERMANN, OF PHILADELPHIA, PENNSYLVANIA

MINIATURE HOTHOUSE

Application filed June 27, 1932. Serial No. 619,533.

This invention relates to miniature hot houses intended more particularly for table ornamentation.

In miniature hot houses of the type specifically referred to, it is the primary aim of my invention to simulate through the influence of indoor temperature variations upon wet soil in which the plants are rooted, natural conditions of humidity favorable to the growth of native, as well as of tropical plants.

Another object of my invention is to attain the foregoing desideratum in a minature hot house which lends itself to very economical manufacture for the most part, from thin nonbreakable flexible transparent material like sheet celluloid or "Cellophane", with wire reinforced sections capable of being folded into a flat package for convenience of merchandising, and so interconnected as to be easily assembled initially, as well as partially disassembled subsequently when access to the plants is necessary.

My invention is also directed toward provisions in connection with miniature hot houses, for ventilation to preclude objectionable "sweating" such as would obstruct vision and prevent the plants from being seen.

Still other objects of my invention will be manifest from the detailed description following of the attached drawings, wherein Fig. I is a perspective view of a miniature hot house conveniently embodying the present improvements.

Fig. II shows a cross sectional view of the house taken as indicated by the arrows II—II in Fig. I, and drawn to a larger scale.

Fig. III is a skeletonized perspective view of a portion of the superstructure of the house, including the bottom frame and end wall sections; and, Fig. IV is a view similar to Fig. III showing the side wall and roof sections of the house.

As herein delineated, the miniature hot house of my invention comprises a tray-like bottom 10 for the soil into which the plants are to be placed; and a superstructure 11 which fits or seats into the said tray-like bottom, and which includes gable end wall sections 12, side wall sections 13, and roof sections 14. Except for differences in configuration, proportion, and in some minor details separately pointed out later on, the end and side wall sections 12 and 13, and the roof sections 14 are identically constructed, each having a reinforcing frame of wire 15 over which thin non-breakable flexible transparent sheet material like celluloid or "Cellophane" 16 is stretched, see Figs. II and IV. As shown, the edges of the transparent sheet material 16 are in each instance folded over the wire and the lapping portions secured to the back of the sheet by pasting or cementing. At the upper corners of the side wall sections 13 the wire frames 15 are formed with eyes 17, and at the lower corners with bifurcations or clevises 18 whereof the function will be presently described.

From Fig. III it will be observed that the wire frames of the end wall sections 12 are formed at their lower corners with hinge eyes 19 that embrace the transverse sides of a base frame 20 for the superstructure 11, said base frame being likewise constructed from wire. At the gable peaks, the wire frames of the end wall sections 12 are formed with eyes 21 which enable the use of a detachable hook-ended ridge wire 22 to space and connect said end wall sections. At the eave corners, the wire frames of the end wall sections 12 are moreover provided with eyes 23 adapted to register with the eyes 17 of the side wall sections 13 for continuous passage through them of securing rods 24 (Fig. I). At one end, each such securing rod 24 is formed with a loop head 25, and, at the other end, fitted with a removable head or nut 26.

The roof sections 14 are hinge-connected to each other and to the said wall sections 13 along contiguous longitudinal edges by links 27 which embrace the contiguous lengthwise sides of the wire frames of the said sections.

To assemble the superstructure 11 of the house, the gabled end-wall sections 12 are swung perpendicular to the base frame 20 and connected by engaging the hook ends of the ridge wire 22 with the eyes 21 at the peaks of the gables. The interconnected side wall and roof sections 13, 14 are thereupon superposed upon the end walls 12. With this accomplished, the securing rods 24 are run through the registering eyes 17, 23 and the heads 26 placed on the free ends of said rods as shown in Fig. I, and the side walls are thereupon sprung to engage their bifurcations or clevises 18 at their lower corners over the sides of the base frame 20 as shown in Fig. I. In this way, the component parts of the superstructure 11 are secured, one to another and the structure thereby held against collapsing.

For the purpose of ventilation, one of the roof sections 14 of the house is formed, in this instance, with a central opening 28 and a regulatable ventilator member 29 for such opening, said member being hinge-connected at 30, 30 to the top edge of the apertured roof section. The hinge connections 30 are afforded by registering eyes 31, 32 formed respectively on the wire frames of the roof section 14 and the ventilator member 29, which latter is constructed exactly like the wall sections of the house, and a hinge pintle 33 is run through said registering eyes 31, 32.

In order to more closely imitate a real hot house, the transparent material 16 of the end wall, side wall and roof sections 12, 13 and 14 are blocked by painting or printing to represent individual glass panes 34, and in addition the end wall sections have doors indicated on them at 35 in Fig. I.

Through the provision of the regulatable ventilator 29 in the roof of the house it is possible in extremely hot weather to prevent "sweating" at the interior of the transparent covering 16, thereby to avoid visional obstruction of the plants. The novel construction of my improved miniature hot house not only favors very economical manufacture and quick assembling, but permits ready access to the interior subsequently for removal or inspection of the plants upon withdrawal of the interconnected side wall and roof sections 13, 14 as shown in dotted lines in Fig. II. The arrangement moreover makes it possible to fold the parts of the superstructure 11 and to form, with the tray-like bottom 10, a compact flat package convenient for the purposes of merchandising and carriage. The tray-like bottom 10 of the house may be made from ceramic material; but for the sake of lightness and cheapness I prefer to fashion it from sheet metal.

In use, the tray-like bottom 10 is filled with moist soil and the plants placed therein. The superstructure 11 is thereupon assembled as already explained and inserted into the tray-like bottom 10. By action of indoor temperature changes the moisture is evaporated out of the wet soil, thereby creating a humidified atmosphere within the house. With temperature drops and barometric changes the moisture vapor is precipitated so that we have a simulation of the natural vaporization and condensation as it occurs outdoors. Under these conditions, plants within the house obviously thrive even in the absence of direct sunlight.

Having thus described my invention, I claim:—

1. A miniature hot house comprising a tray-like bottom for soil; and a superstructure including a base frame seating in said tray with wire-reinforced opposing walls, other opposing walls with a hingedly-connected roof, all covered with non-breakable flexible transparent sheet material.

2. A miniature hot house comprising a tray-like bottom for soil; and a foldable superstructure including an open base frame seating in said tray with wire reinforced opposing walls, other opposing walls with a hingedly-connected collapsible roof, all covered with non-breakable flexible transparent sheet material, and said roof being fitted with a regulatable ventilator.

3. A miniature hot house comprising a tray-like bottom for soil; and a superstructure with a rectangular base frame of wire, end walls attached to the base frame, and removable side walls and roof, said end walls, side walls and roof being all formed from non-breakable flexible transparent sheet material.

4. A miniature hot house comprising a tray-like bottom for soil; and a superstructure with a rectangular base frame of wire, end walls attached to the base frame, and removable hinge-connected side walls and roof, said end walls, side walls and roof being all formed from non-breakable flexible transparent sheet material.

5. A miniature hot house comprising a tray-like bottom for soil; and a superstructure with a rectangular base frame of wire, end walls attached to the base frame, and removable hinge-connected side walls and roof, said end walls, side walls and roof being all formed from non-breakable flexible transparent sheet material, and said roof being provided with a regulatable ventilator.

6. A miniature hot house comprising a tray-like bottom for soil; and a superstructure with a rectangular base frame of wire, gabled end walls attached to the base frame, and removable hinge-connected side walls and roof sections, said end walls, side walls and roof sections being all formed from non-breakable flexible transparent sheet material.

7. A miniature hot house comprising a tray-like bottom for soil; a superstructure with a rectangular base frame of wire, end walls hinge-connected to the base frame, removable hinge-connected side walls and roof, said end walls, side walls and roof being made from non-breakable flexible transparent sheet material mounted over wire reinforcing frames; and removable longitudinal securing rods engaging continuously through eyes at the upper corners of the wire frames of the end walls and along the upper edges of the wire frames of the side walls.

8. A miniature hot house comprising a tray-like bottom for soil; and a superstructure with a rectangular base frame of wire, gabled end walls pivotally connected to the base frame, a ridge rod having hook ends for engaging eyes at the peaks of the gabled end walls thereby to space and connect said end walls, and side wall and roof sections removably attached to said end walls and base frame.

9. A miniature hot house comprising a tray-like bottom for soil; and a superstructure with a wire base frame, wire-framed end walls connected to the base frame, removable wire-framed side walls having eyes at their upper corners to register with eyes at the eave corners of the end walls for passage of securing rods, the wire frames of the side walls being also formed at their lower corners with bifurcations adapted, upon springing of said side walls, to engage over the wire of the base frame.

In testimony whereof, I have hereunto signed my name at Philadelphia, Pennsylvania, this 23rd day of June, 1932.

ADOLF LIERMANN.